US012800903B2

(12) United States Patent
Choi et al.

(10) Patent No.: US 12,800,903 B2
(45) Date of Patent: Nov. 17, 2026

(54) SYSTEM AND METHOD FOR OPTICAL DETECTION BASED ON IMAGE SEGMENTATION

(71) Applicant: SEOUL NATIONAL UNIVERSITY R&DB FOUNDATION, Seoul (KR)

(72) Inventors: Myunghwan Choi, Seoul (KR); Seonghoon Kim, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 598 days.

(21) Appl. No.: 18/242,632

(22) Filed: Sep. 6, 2023

(65) Prior Publication Data

US 2024/0095926 A1 Mar. 21, 2024

(30) Foreign Application Priority Data

Sep. 15, 2022 (KR) ........................ 10-2022-0116427

(51) Int. Cl.
*G02B 21/36* (2006.01)
*G06T 7/11* (2017.01)
*G06T 7/246* (2017.01)

(52) U.S. Cl.
CPC .............. *G02B 21/367* (2013.01); *G06T 7/11* (2017.01); *G06T 7/246* (2017.01); *G06T 2207/10056* (2013.01)

(58) Field of Classification Search
CPC .......... G02B 21/367; G06T 7/11; G06T 7/246
See application file for complete search history.

(56) References Cited

U.S. PATENT DOCUMENTS

2018/0081159 A1* 3/2018 Lippert .................. G02B 21/16

FOREIGN PATENT DOCUMENTS

| | | | |
|---|---|---|---|
| JP | 2003-255231 | A | 9/2003 |
| JP | 5489541 | B2 | 5/2014 |
| KR | 10-2016-0016962 | A | 2/2016 |
| KR | 10-2017-0099985 | A | 9/2017 |

OTHER PUBLICATIONS

Kim, Seonghoon et al., "Focus on Microscopy," Adaptive Image Segmentation for Crosstalk-Free High-Speed Compressive Imaging, FOM 2022, Apr. 10-13, 2022, (3 Pages in English).

Kim, Seonghoon et al., "Kilohertz All-Optical Electrophysiology of Neuronal Circuits," The 25th Annual Meeting of the Korean Society for Brain and Neural Sciences, May 19-21, 2022, (3 Pages in English).

(Continued)

*Primary Examiner* — Nicholas G Giles
(74) *Attorney, Agent, or Firm* — NSIP Law

(57) ABSTRACT

An optical detection system based on image segmentation according an embodiment of the present disclosure includes a pattern generator configured to select at least one region-of-interest from a target image and generate a specific pattern for controlling optical paths for the at least one region-of-interest, a light modulator configured to receive the specific pattern and selectively separate the optical paths for the at least one region-of-interest from the target image, and an optical detection unit configured to detect separated optical signals for the at least one region-of-interest based on different pixels.

8 Claims, 9 Drawing Sheets

(56) References Cited

OTHER PUBLICATIONS

Kim, Seonghoon et al., "Optical Segmentation for Compressed Readout on Submillisecond Neuronal Circuit Dynamics," 6th International Symposium Frontiers in Neurophotonics, Oct. 10-12, 2022, (3 Pages in English).

Kim, Seonghoon et al., "Optical Segmentation for Compressed Readout On Submillisecond Neuronal Circuit Dynamics," Optical Society of Korea Winter Conference 2023, Feb. 15, 2023, (2 Pages in English).

* cited by examiner

SYSTEM AND METHOD FOR OPTICAL DETECTION BASED ON IMAGE SEGMENTATION

CROSS-REFERENCE TO RELATED APPLICATION

This application is based on and claims priority under 35 U.S.C. § 119 to Korean Patent Application No. 10-2022-0116427, filed on Sep. 15, 2022, in the Korean Intellectual Property Office, the disclosure of which is incorporated by reference herein in its entirety.

BACKGROUND

The present disclosure relates to a system and method for optical detection based on image segmentation.

Adaptive light modulation technology is technology for controlling an optical path by using a digital light modulation device and used in beam projectors or hologram displays. Recently, the adaptive light modulation technology has been variously used in optogenetic stimulation, fluorescence excitation, multiphoton microscopy, and so on, but is mainly used in light emission modules. Some light modulation technologies are used by placing a light modulator in a measurement path between a sample and an optical detector (or a camera). However, the technology is mainly used for the purpose of reducing image distortion by reducing optical aberration.

A device for detecting optical signals includes a camera and a point detector. When a camera is used, a method of recording only a part of an imaging region (subarray readout) or recording pixels in a group (pixel binning) is mainly used for high-speed imaging. However, in this case, there may be a problem in that an observation region is limited or a resolution is lowered.

In most cases, a frame rate of a general camera is tens to hundreds of Hz. That is, in order to capture an image at a frame rate higher than KHz, image processing has to be performed by using only very limited pixels, and accordingly, application is severely limited. In addition, a point detector actually has no limit in speed, but since information of only one pixel is recorded at a time, there is a disadvantage in that an image has to be combined with a scanning module to be recorded. Even in this case, there is a problem in that it is difficult to increase speed more than KHz because the speed is reduced as more scanning is performed.

In this regard, Korean Patent Publication No. 10-2017-0099985 (Title of the Invention: IMAGING METHOD, AND SYSTEM, FOR OBTAINING A SUPER-RESOLUTION IMAGE OF AN OBJECT) discloses an imaging method for obtaining a super-resolution image of an object based on an optical microscope configured to capture an image of the object.

SUMMARY

The present disclosure provides an optical detection system and an optical detection method that may detecting an optical signal in units of a certain region-of-interest (ROI) desired by a user.

Technical objects to be achieved by the present embodiments are not limited to the above technical object, and there may be other technical objects.

According to an aspect of the present disclosure, an optical detection system based on image segmentation includes a pattern generator configured to select at least one region-of-interest from a target image and generate a specific pattern for controlling optical paths for the at least one region-of-interest, a light modulator configured to receive the specific pattern and selectively separate the optical paths for the at least one region-of-interest from the target image, and an optical detection unit configured to detect separated optical signals for the at least one region-of-interest based on different pixels.

According to another aspect of the present disclosure, an optical detection method using an optical detection system based on image segmentation includes selecting at least one region-of-interest from a target image and generating a specific pattern for controlling optical paths for the at least one region-of-interest by using a pattern generator, receiving the specific pattern and selectively separating the optical paths for the at least one region-of-interest from the target image by using a light modulator, and detecting, by an optical detection unit, separated optical signals for the at least one region-of-interest based on different pixels.

According to any one of the above-described problem solving means of the present application, a region-of-interest to be observed at high speed is separated optically from an image captured at high resolution and high speed, and then, optical signals generated in each region-of-interest are detected based on different pixels, and accordingly, The optical signals may be recorded at high speed.

Furthermore, the present disclosure may be attached to various camera-based microscopes in the form of an additional module, and thus, the present disclosure may be easily applied to the industry.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
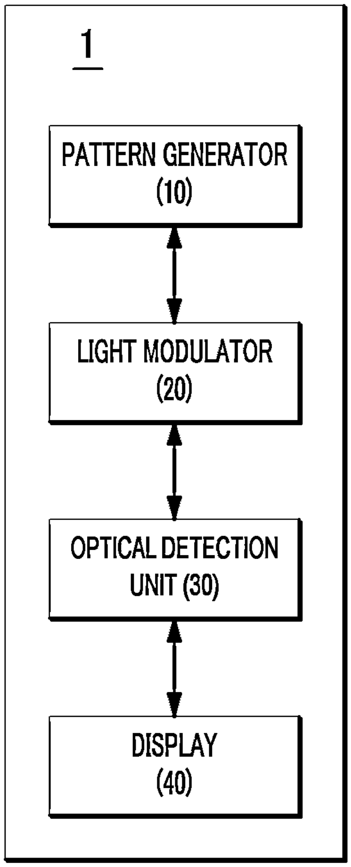
FIG. 1 is a block diagram of an optical detection system based on image segmentation according to an embodiment of the present disclosure.

Hereinafter, embodiments of the present disclosure will be described in detail such that those skilled in the art to which the present disclosure belongs may easily implement the present disclosure with reference to the accompanying drawings. However, the present disclosure may be implemented in many different forms and is not limited to the embodiments to be described herein. In addition, in order to clearly describe the present disclosure with reference to the drawings, portions irrelevant to the description are omitted, and similar reference numerals are attached to similar portions throughout the specification.

The suffixes "module" and "unit" for components used in the following description are given or used interchangeably in consideration of only the ease of writing the specification, and do not have meanings or roles that are distinct from each other by themselves. In addition, in describing the embodiments disclosed in this specification, if it is determined that a detailed description of related known technologies may obscure the gist of the embodiments disclosed in this specification, the detailed description is omitted.

When it is described that a portion is "connected (coupled or in contact)" to another portion throughout the specification, this includes not only a case where the portion is "directly connected (coupled or in contact)" to another portion but also a case where the portion is "indirectly connected (coupled or in contact)" to another portion with another component therebetween. In addition, when it is described that a portion "includes (comprises or prepares)" a certain component, this means that the portion may further include (comprises or prepares) another component without excluding another component unless otherwise stated.

First, the known spatial light modulation device is used to control a shape of a light source emitting light to a sample. That is, a photoreaction or fluorescence signal of a partially selective region is measured through the shape of an excitation light source for light emission. For example, a general optical imaging method includes pixel binning for increasing a temporal resolution, a subarray readout method that observes only a part of an optical zoom and a sensor, a method of scanning only a limited observation region, or a combination of the methods. As such, the known optical imaging method is implemented in a way to increase a temporal resolution by limiting a spatial resolution or an observation region. Here, when the spatial resolution is limited, there is a problem in that signals in adjacent regions are interfered with each other.

However, in the present disclosure, after modulating an optical path of the observation region in a high-resolution state and separating the optical path from the adjacent regions, light is detected by compressing one or a very limited number of detection pixels. Accordingly, data sampling is reduced, and it is possible to analyze signals at very high speed.

In other words, unlike the known art, the present disclosure is not limited to the shape of a light source and may be applied to fluorescence, reflection, transmission, and light emission, and also, extended application is possible because signals generated in several adjacent regions may be measured without interference. In addition, since there is no interference between observation regions, ultra-high-speed optical signal measurement is possible through additional optical compression.

Therefore, according to the present disclosure, a spatial resolution and a temporal resolution may be separated from each other by flexibly modulating the standardized optical signal measurement path of the known optical imaging method. That is, as the spatial resolution is separated from the temporal resolution, a change of an optical signal generated from a complex structure may be measured at high speed without influence of a surrounding structure.

For example, when high-speed imaging is taken by the known method, high-speed imaging is usually performed by reducing the resolution of an image or capturing only a part of the image. However, in the present disclosure, after a region-of-interest (ROI) to be observed is set from a digital image in a high-resolution state, an optical signal generated in the region (region-of-interest) may be separated through light modulation technology. Thereafter, the separated optical signal may be randomly assigned to one or a very small number of optical lenses and optical detectors (optical detection unit). Accordingly, one or more optical lenses and an optical detector (optical detection unit) have different pixels, and thus, an optical signal may be recorded by using only a very small number of pixels compared to the known method.

Hereinafter, embodiments of the present disclosure are described in detail with reference to the accompanying drawings.

FIG. 1 is a configuration diagram of an optical detection system based on image segmentation according to an embodiment of the present disclosure.

As illustrated in FIG. 1, an optical detection system based on image segmentation 1 may include a pattern generator 10, a light modulator 20, an optical detection unit 30, and a display 40.

Referring to FIG. 1, the optical detection system based on image segmentation 1 includes a pattern generator 10 that selects at least one region-of-interest from a target image and generates a specific pattern for controlling an optical path for each region-of-interest, a light modulator 20 that receives a specific pattern and selectively separates an optical path of each region-of-interest from the target image, and an optical detection unit 30 that detects the separated optical signal for each region-of-interest based on different pixels.

Accordingly, by using different pixels for each region-of-interest, a measurement speed is greatly increased compared to the known pixel-based measurement method, and readout noise may be effectively removed.

For example, the optical detection system based on image segmentation 1 may further include a memory (not illustrated) for storing an optical path control program of a region-of-interest. In this case, the optical path control program of region-of-interest stored in the memory may be driven by the pattern generator 10.

In addition, the memory performs a function of storing data processed by the pattern generator 10. Here, the memory may include non-volatile storage media.

The memory may also store another program, such as an operating system for processing and controlling the pattern generator 10, or may also perform a function of temporarily storing data that is input or output.

The memory may include at least one type of storage medium, for example, a memory (for example, a secure digital (SD) memory, an extreme digital (XD) memory, or so on) of a flash memory type, a hard disk type, a multimedia card micro type, or a card type, random access memory (RAM), and read only memory (ROM). In addition, the optical detection system based on image segmentation 1 may also operate a web storage that performs a memory storage function on the Internet.

The pattern generator 10 executes a program for controlling an optical path of a region-of-interest stored in the memory, and controls the entire operation for controlling the optical path of the region-of-interest.

To this end, the pattern generator 10 may include at least one processing unit (a central processing unit (CPU), a micro-processor, a digital signal processor (DSP), or so on), RAM, ROM, and so on, and may be read a program stored in a memory into RAM and execute the program through at least one processing unit. In addition, a term ‘processor’ may be interpreted as the same meaning as terms, such as a ‘controller’, an ‘arithmetic device’, and a ‘pattern generator’ depending on embodiments.

Figure 2:
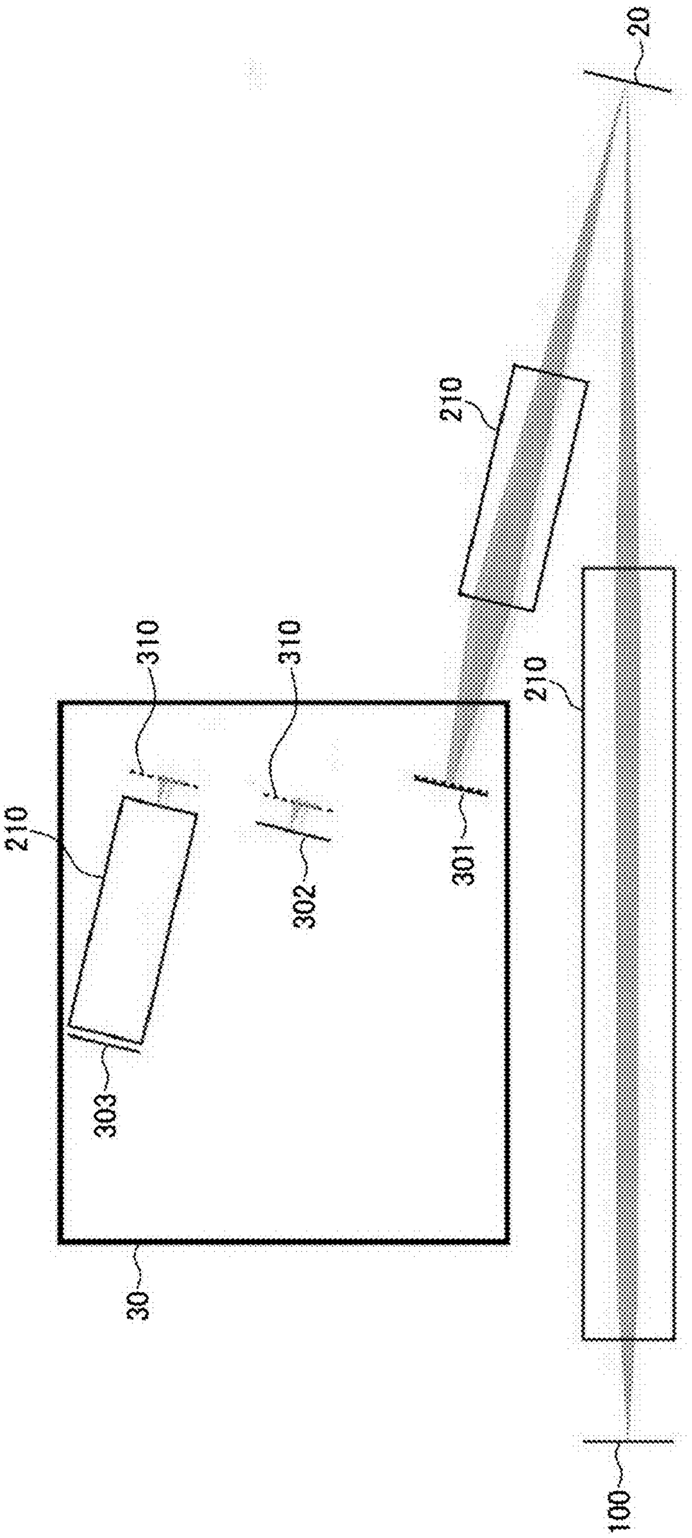
FIG. 2 is a structural view of an optical detection system based on image segmentation according to an embodiment of the present disclosure.

FIG. 2 is a structural view of an optical detection system based on image segmentation according to an embodiment of the present disclosure.

Specifically, the light modulator 20 receives a target image and selectively separates an optical path of each region-of-interest. For example, the light modulator 20 includes a digital micromirror device, a liquid crystal-based transmissive or reflective spatial light modulator, or a scanner (a galvanometer, an acousto-optic deflector, an electro-optic deflector, or so on).

Here, the target image includes an image captured in high resolution, but is not limited to, and includes an optical signal including transmission, reflection, fluorescence, phase-contrast, and so on.

The optical detection unit 30 detects an optical signal separated for each region-of-interest based on different pixels. That is, the optical detection unit 30 may be composed of a point detector array or a camera using only a limited number of pixels. Accordingly, it is possible to simultaneously measure signals generated from several adjacent regions of interest without interference. In addition, since there is no interference between regions of interest to be observed, an ultra-high-speed optical signal may be measured through additional optical compression.

For example, the optical detection unit 30 includes an optical lens and an optical detector. For example, the optical lens includes an optical camera, such as a scientific complementary metal oxide semiconductor (sCMOS), an electron multiplying charge coupled device (EMCCD), or a CCD, but is not limited thereto. In addition, the optical detector includes a plurality of point light source detectors or an array type detection system based on a photomultiplier tube (PMT), an avalanche photodiode (APD), and a single-photon avalanche diode (SPAD), but is not limited thereto.

The light modulator 20 may include a spatial light modulator (SLM). In this case, the present disclosure may include a relay lens unit 210 that adjusts a size of an image transferred from the spatial light modulator to match the predetermined pixel size of the optical detection unit 30.

For example, referring to FIG. 2, the optical detection system based on image segmentation 1 of the present disclosure may be formed as a module shape added to various camera-based microscopes. For example, the optical detection unit 30 may include the relay lens unit 210, a first optical detector 301, a second optical detector 302, a third optical detector 303, and a microlens array 310.

As illustrated in FIG. 2, the present disclosure includes the relay lens unit 210 that transfers a target image 100 to the light modulator 20, and the light modulator 20, the microlens array 310 for the first to third optical detectors 301 to 303, and the optical detection unit 30 in which the relay lens unit 210 is composed of one module. That is, the optical detection unit 30 may include the first optical detectors 301 to third optical detectors 303 that detect optical signals for each region-of-interest segmented from the target image 100 transferred from the light modulator 20. In this case, the number of optical detectors is not limited. Here, an operation process of the pattern generator 10 for generating a specific pattern for controlling an optical path for each region-of-interest is described below with reference to FIGS. 3 to 6C.

For example, the target image 100 is an optical image formed at a position of a camera port of a microscope and may be transferred to a surface of the light modulator 20 through the relay lens unit 210. In this case, the relay lens unit 210 may reduce or increase a size of the target image 100 by considering a size and modulation parameters of the light modulator 20.

For example, when the light modulator 20 is a spatial light modulator, the relay lens unit 210 may be arranged between the spatial light modulator and the first optical detector 301. In this case, the relay lens unit 210 may adjust an optical signal for each region-of-interest from the spatial light modulator to match pixel sizes of the first optical detector 301 to the third optical detector 303.

That is, the optical detection unit 30 may include a plurality of optical detector modules. For example, the plurality of optical detector modules may each be composed of the microlens array 310 and the second optical detector 302 and may detect sub-images divided from an image received through the microlens array 310. In another example, the optical detector module may be composed of the microlens array 310, the relay lens unit 210, and the third optical detector 303, adjust the sub-images divided through the microlens array 310 to sub-images with an appropriate size suitable for the size of the third optical detector 303 through the relay lens unit 210, and then detect the adjusted sub-images.

The display 40 may output a target image to allow a user to select a region-of-interest or output an optical signal received from the optical detection unit. A detailed description of the display 40 is described below.

Figure 3:
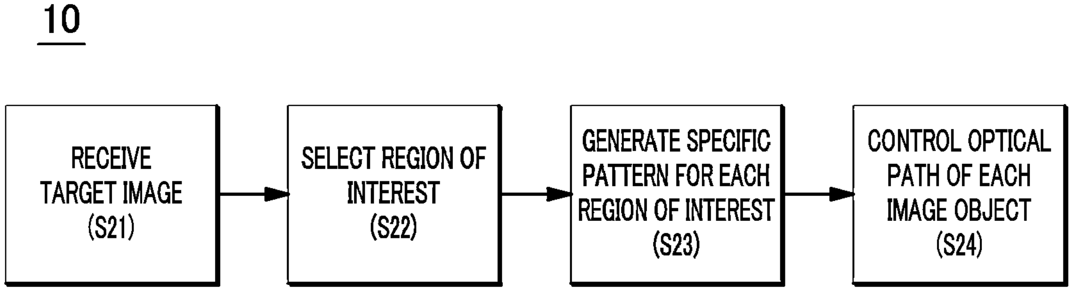
FIG. 3 is a flowchart illustrating a method of controlling an optical path of a region-of-interest by a pattern generator, according to an embodiment of the present disclosure.
Figure 4A:
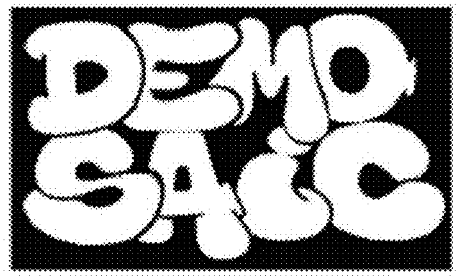
FIGS. 4A, 4B, 4C and 4D are views illustrating an example in which each object is output by controlling an optical path of a region-of-interest for each step according to FIG. 3.
Figure 4B:
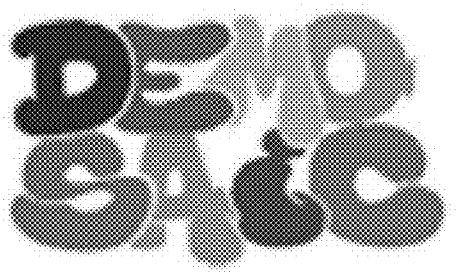
Figure 4D:
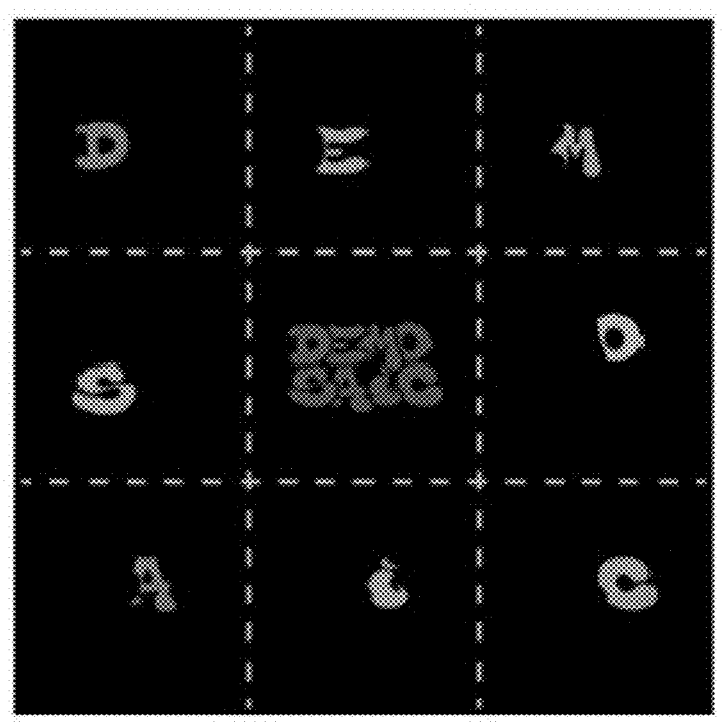
Figure 4C:
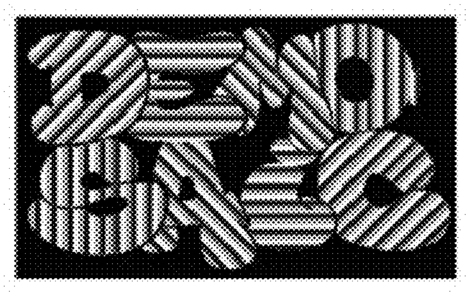
Figure 5:
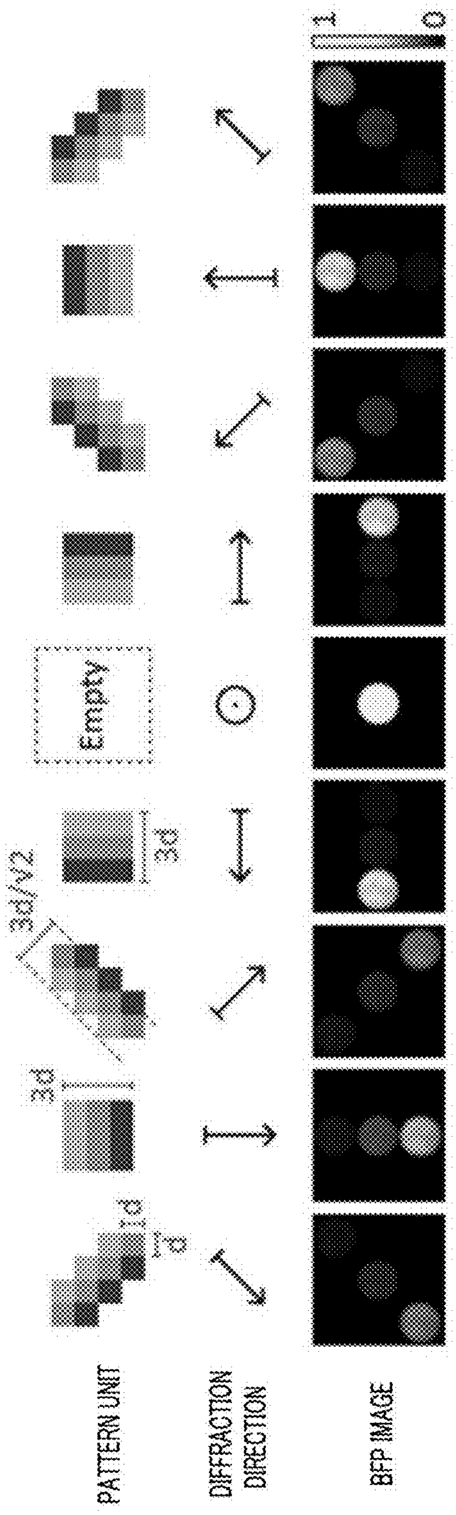
FIG. 5 is a view illustrating a specific pattern for controlling a movement direction of an object corresponding to each region-of-interest, according to an embodiment of the present disclosure.

FIG. 3 is a flowchart illustrating a method of controlling an optical path of a region-of-interest by a pattern generator, according to an embodiment of the present disclosure, FIGS. 4A to 4D are views illustrating an example in which each object is output by controlling an optical path of a region-of-interest for each step according to FIG. 3, and FIG. 5 is a view illustrating a specific pattern for controlling a movement direction of an object corresponding to each region-of-interest, according to an embodiment of the present disclosure.

Referring to FIG. 3, the pattern generator 10 may receive a target image (S21), select at least one region-of-interest from the target image (S22), and generate a specific pattern for controlling an optical path for each region-of-interest (S23). Subsequently, the pattern generator 10 may set directions, intervals, and colors of a grating pattern differently for each region-of-interest to distinguish a specific pattern and to simultaneously control an optical path of each image object corresponding to each region-of-interest (S24).

For example, as illustrated in FIG. 4A, in step S21, the pattern generator 10 may receive a target image and outputs the target image through the display 40 such that a user selects a region-of-interest. Subsequently, as illustrated in FIG. 4B, in step S22, at least one region-of-interest may be selected from the target image by a user or the pattern generator 10. For example, when a target image for which a region-of-interest is to be set is output through the display 40, a user may directly select eight characters from the target image consisting of a letter DEMOSAIC as each of eight regions of interest. Alternatively, each of the eight regions of interest may be automatically selected by the pattern generator 10. In this case, the pattern generator 10 may convert an image resolution such that specific coordinates of the region-of-interest output by the display 40 matches specific coordinates of the region-of-interest received by the light modulator 20. For example, since the resolution of the target image captured by a camera is different from the resolution of the light modulator 20, the image resolution may be converted according to an equation of target image (RI1) =transformation matrix (MSLM)*light modulator (RI2). In this case, the conversion matrix may be calculated by a point-based spatial data coregistration method, but is not limited thereto.

As illustrated in FIG. 4C, in step S23, a specific pattern for controlling an optical path for each region-of-interest may be generated. Next, the pattern generator 10 may distinguish a specific pattern by setting directions, intervals, and colors of a grating pattern differently for each region-of-interest. At the same time, as illustrated in FIG. 4D, in step S24, an optical path of each image object corresponding to each region-of-interest may be controlled.

For example, the pattern generator 10 may generate a binary image for each region-of-interest and fill a grating pattern in a white region of the binary image. In this case, the grating pattern may be filled with different directions and intervals of a grating constituting each white region. Accordingly, the pattern generator 10 may transfer regions of interest (respective image objects) filled with different patterns to the light modulator 20, and the light modulator 20 may selectively separate optical paths of the respective regions of interest (respective image objects).

For example, referring to FIGS. 4A to 5, the grating pattern separating optical paths of the respective regions of interest may be composed of a pattern unit divided into eight diffraction directions based on the center. In this case, the pattern unit may include three straight lines 3*d* with different brightness for each parallel straight line d, which is composed of one unit.

For example, as illustrated in FIGS. 4C and 4D, a specific pattern may be applied to a region-of-interest corresponding to an object 'A'. In this case, as illustrated in FIG. 5, the specific pattern of the object 'A' may include a diffraction direction consisting of a lower left direction (7:30 clockwise) and a pattern unit consisting of a diagonal line inclined to the lower right. In this case, the pattern unit may be composed of three straight lines 3*d* of black, gray, and white. In the pattern unit of the object 'A', a black diagonal line with the lowest brightness among the three straight lines may be arranged on a lower left side that is the same direction as the diffraction direction of the object 'A'. As illustrated in FIGS. 4C and 4D, the specific pattern of an object 'M' facing the object 'A' may include a diffraction direction consisting of an upper right direction (1:30 clockwise) with the object's back to the diffraction direction of the object 'A' and a pattern unit consisting of diagonal lines inclined to the lower right. In this case, directions of the grating patterns of the object 'A' and the object 'M' are the same as each other, but unlike the pattern unit of the object 'A', the pattern unit of the object 'M' may be arranged on an upper right side in which a direction of a black diagonal line with the lowest brightness among the three straight lines 3*d* is the same as the diffraction direction of the object 'M'.

Similarly, as illustrated in FIG. 5, the specific pattern of the object 'D' may include a diffraction direction consisting of an upper left direction (10:30 clockwise) and a pattern unit consisting of a diagonal line inclined to a lower left. In this case, the pattern unit of the object 'D' may be arranged on an upper left side in which a direction of a diagonal line (black color) with the lowest brightness among the three straight lines is the same as the diffraction direction of the object 'D'. A specific pattern of the object 'C' facing the object 'D' may include a diffraction direction consisting of a lower left direction (4:30 clockwise) and a pattern unit consisting of a diagonal line inclined to a lower left. In this case, directions of the grating patterns of the object 'C' and the object 'D' are the same as each other, but unlike the pattern unit of the object 'D', the pattern unit of the object 'C' may be arranged on a lower left side in which a direction of a diagonal line (black) with the lowest brightness among the three straight lines is the same as the diffraction direction of the object 'C'.

In an object 'E' having an upward (12 o'clock clockwise) diffraction direction and an object 'I' having a downward (6 o'clock clockwise) diffraction direction, a pattern unit of the object 'E' may be arranged on an upper side in which a direction of a straight line (black) with the lowest brightness among the three straight lines is the same as the diffraction direction of the object 'E', and a pattern unit of the object 'I' may be arranged on a lower side in which a direction of a straight line (black) with the lowest brightness among the three straight lines is the same as the diffraction direction of the object 'I'.

In an object 'S' having an left (9 o'clock clockwise) diffraction direction and an object 'O' having a right (6 o'clock clockwise) diffraction direction, a pattern unit of the object 'S' may be arranged on the left side in which a direction of a straight line (black) with the lowest brightness among the three straight lines is the same as the diffraction direction of the object 'S', and a pattern unit of the object 'O' may be arranged on the right side in which a direction of a straight line (black) with the lowest brightness among the three straight lines is the same as the diffraction direction of the object 'O'.

As illustrated in FIG. 4D, the pattern generator 10 may display, on the display 40, the entire object screen which outputs all objects corresponding to each region-of-interest and divided screens in a direction coincident with a movement direction (diffraction direction) of each object based on the entire object screen.

Figure 6A:
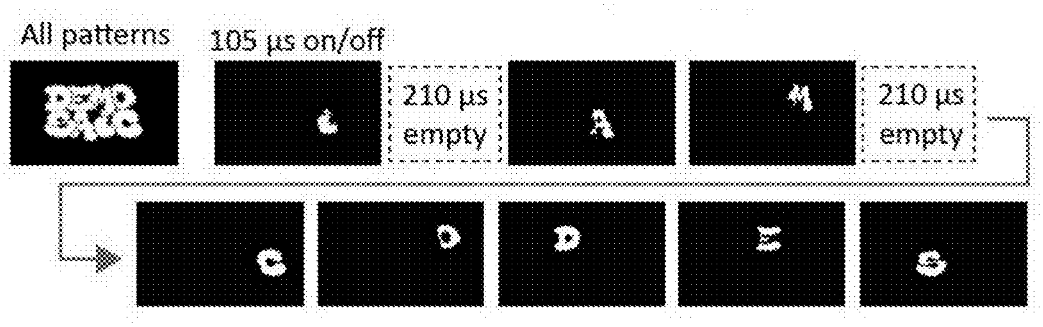
FIGS. 6A, 6B and 6C comparatively illustrate analysis results of signals measured by a microscope of the present disclosure and the known microscope.
Figure 6B:
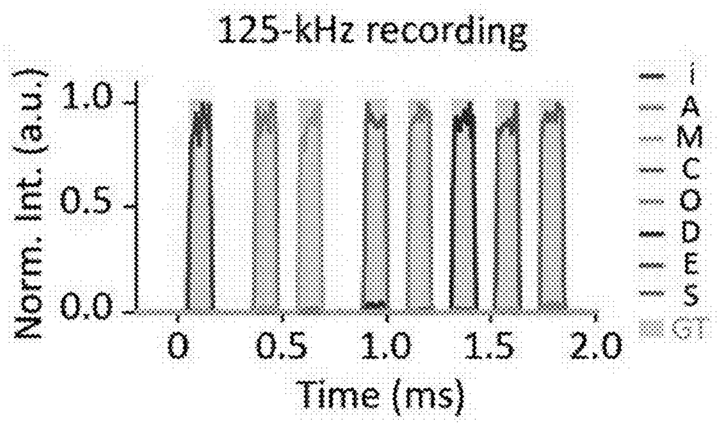
Figure 6C:
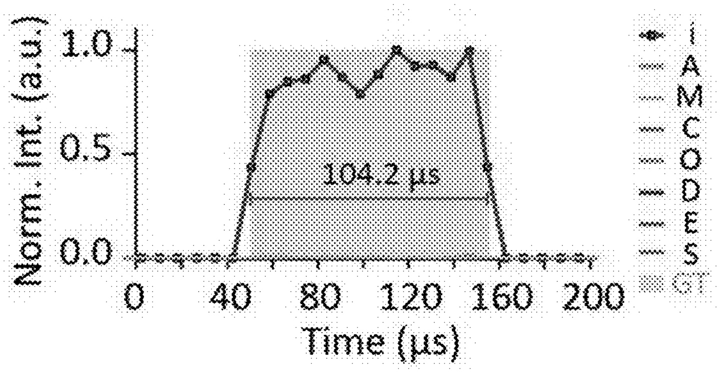
Figure 7:
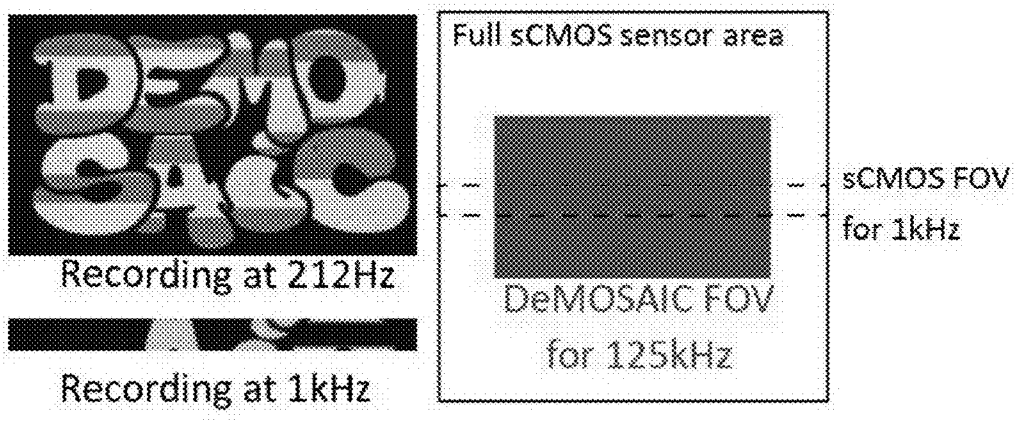
FIG. 7 comparatively illustrates analysis results of optical signals measured by a microscope of the present disclosure and the known microscope.
Figure 8A:
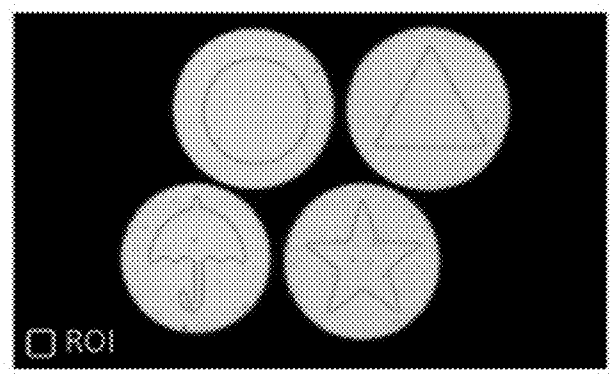
FIGS. 8A, 8B and 8C illustrate other examples in which each object is output according to a method of controlling an optical path of a region-of-interest of the present disclosure.
Figure 8B:
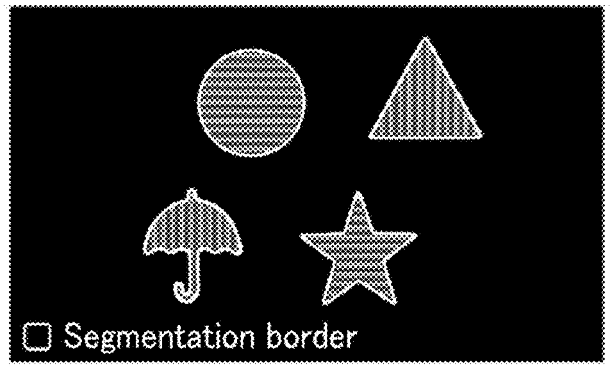
Figure 8C:
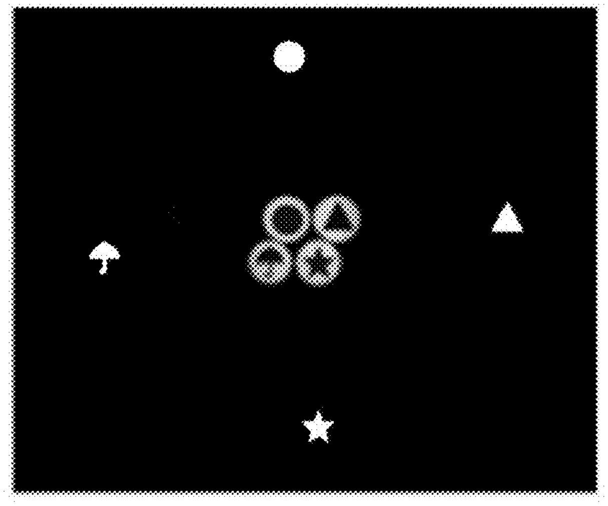

FIGS. 6A to 7 comparatively illustrate optical signal analysis results measured by the microscope of the present disclosure and the known microscope, and FIGS. 8A to 8C illustrate other examples in which each object is output according to a method of controlling an optical path of a region-of-interest of the present disclosure.

For example, in order to compare the optical detection performance of microscope of the present disclosure with the optical detection performance of the known microscope, an optical signal of each region-of-interest was detected by using an optical setup including the light modulator 20 composed of a digital micro reflective indicator and the optical detection unit 30 composed of a photomultiplier tube (PMT) device. As illustrated in FIG. 6A, a target image on which a letter DEMOSAIC is superimposed is projected onto a surface of the light modulator 20, and then, respective objects (characters) are set to flicker in units of 105 microseconds according to a time sequence.

As illustrated in FIG. 7, as a result of measurement using the known microscope, it is difficult to distinguish a flickering signal in units of microsecond, and even when using a single PMT device, it is not possible to know from which object an optical signal is generated.

According to the present disclosure, FIGS. 4B, 6B, and 6C illustrate results of the measurement at 125 kHz, and the shape and position of each object (region-of-interest) in which an optical light signal is generated and a change in intensity of the optical signal may be checked. For example, FIG. 6B is a graph illustrating a change in intensity of optical signals of all objects, and FIG. 6C is a graph illustrating a change in intensity of an optical signal of an object 'I' that first flickers according to the time sequence of FIG. 6A. That is, the present disclosure may specify from which object an optical signal is generated, unlike the known technology. This measurement speed is more than 600 times faster than the maximum speed (200 Hz in the case of general sCMOS) that may be implemented when observing the same region-of-interest with the known microscope.

In another embodiment, when four regions of interest are selected from a target image as illustrated in FIG. 8A, the pattern generator 10 may apply a specific pattern that includes a diffraction directions in up, down, left, and right directions described above for each region-of-interest and a pattern unit consisting of three straight lines of black, grey, and back, and the light modulator 20 may receive a specific pattern in which movement directions of respective objects for four region-of-interest are set and separate optical paths of the respective region-of-interest, as illustrated in FIG. 8B. In this case, as illustrated in FIG. 8C, the display 40 may display all of four objects on a main screen and display the divided screens of the respective objects in a direction consistent with the movement direction of each object based on the central main screen.

Hereinafter, descriptions of the same configurations among the configurations illustrated in FIGS. 1 to 8C are omitted.

Figure 9:
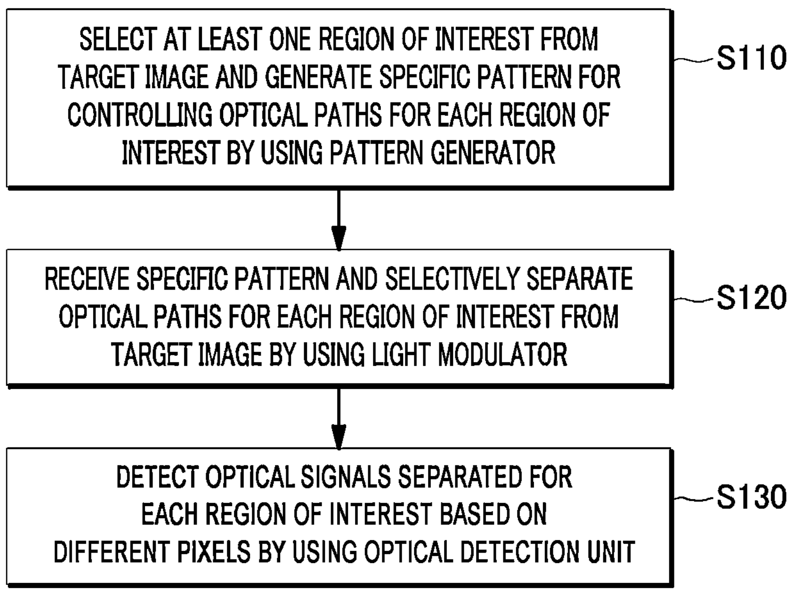
FIG. 9 is a flowchart illustrating an optical detection system based on image segmentation according to another embodiment of the present disclosure.

FIG. 9 is a flowchart illustrating an optical detection method using an optical detection system based on image segmentation, according to another embodiment of the present disclosure.

Referring to FIG. 9, an optical detection method using the optical detection system based on image segmentation 1, according to another embodiment of the present disclosure includes a step of selecting at least one region-of-interest from a target image and generating a specific pattern for controlling optical paths for each region-of-interest (S110), a step of receiving the specific pattern and selectively separating the optical paths for each region-of-interest from the target image by using the light modulator 20 (S120), and a step of detecting optical signals separated for each region-of-interest based on different pixels by using the optical detector 30 (S130).

In step S110, the pattern generator 10 distinguishes a specific pattern by differently setting directions, intervals, and colors of grating patterns for each region-of-interest, and also control a movement direction of each image object corresponding to each region-of-interest. In addition, the pattern generator 10 may convert an image resolution, a size, a position, and a direction such that coordinates of the regions of interest output by the display 40 match specific coordinates of the region-of-interest received by the light modulator 20. For example, the light modulator 30 may be a spatial light modulator, and may include a phase only spatial light modulator (SLM) that modulates an optical phase, and a digital micromirror device (DMD) that may control an optical phase for each pixel, and may further include a relay lens unit for adjusting a size of a divided image from the spatial light modulator to match a predetermined size of a pixel of an optical detection unit.

A step of outputting a target image by the display 40 such that a user selects a region-of-interest may be provided before step S110.

After step S130, the display 40 may output an optical signal received from the optical detection unit 30, and the pattern generator 10 may display, on the display 40, the entire object screen which outputs all objects corresponding to each region-of-interest through the display 40 and divided screens in a direction coincident with a movement direction of each object based on the entire object screen.

One embodiment of the present disclosure may be implemented in the form of a recording medium including instructions executable by a computer, such as a program module executed by a computer. A computer readable medium may be any available medium that may be accessed by a computer and includes both volatile and nonvolatile media, removable and non-removable media. Also, the computer readable medium may include a computer storage medium. A computer storage medium includes both volatile and nonvolatile media and removable and non-removable media implemented by any method or technology for storing information, such as computer readable instructions, data structures, program modules or other data.

Although the method and systems of the present disclosure are described with reference to specific embodiments, some or all of their components or operations may be implemented by using a computer system having a general-purpose hardware architecture.

The above description of the present disclosure is for illustrative purposes, and those skilled in the art to which the present disclosure belongs will understand that the present disclosure may be easily modified into another specific form without changing the technical idea or essential features of the present disclosure. Therefore, the embodiments described above should be understood as illustrative in all respects and not limiting. For example, each component described as a single type may be implemented in a distributed manner, and likewise, components described as distributed may be implemented in a combined form.

The scope of the present disclosure is indicated by the following claims rather than the detailed description above, and the meaning and scope of the claims and all changes or modifications derived from the equivalent concepts should be interpreted as being included in the scope of the present disclosure.

What is claimed is:

1. An optical detection system based on image segmentation, the optical detection system comprising:

a pattern generator configured to select at least one region-of-interest from a target image and generate a specific pattern for controlling optical paths for the at least one region-of-interest;

a light modulator configured to receive the specific pattern and selectively separate the optical paths for the at least one region-of-interest from the target image; and an optical detection unit configured to detect separated optical signals for the at least one region-of-interest based on different pixels, wherein the light modulator is a spatial light modulator and includes a phase only spatial light modulator that modulates an optical phase and a digital micromirror device that controls the optical phase for each pixel, and wherein the optical detection system further includes a relay lens unit for adjusting a size of a divided image from the spatial light modulator to match a predetermined size of a pixel of the optical detection unit.

2. The optical detection system of claim 1, wherein the pattern generator distinguishes the specific pattern by differently setting directions, intervals, and colors of grating patterns for the at least one region-of-interest and also controls an optical path of an image object corresponding to each of the at least one region-of-interest.

3. The optical detection system of claim 2, further comprising:

a display configured to output the target image such that a user selects the region-of-interest or output an optical signal received from the optical detection unit, wherein the pattern generator displays, on the display, an entire object screen which outputs all objects corresponding to the at least one region-of-interest and divided screens in a direction coincident with a movement direction of the image object based on the entire object screen.

4. The optical detection system of claim 3, wherein the target image includes an image captured in high resolution, and the pattern generator converts an image resolution, a size, a position, and a direction such that coordinates of the at least one region-of-interest output by the display match specific coordinates of the at least one region-of-interest received by the light modulator.

5. An optical detection method using an optical detection system based on image segmentation, the optical detection method comprising:

selecting at least one region-of-interest from a target image and generating a specific pattern for controlling optical paths for the at least one region-of-interest by a pattern generator;

receiving the specific pattern and selectively separating the optical paths for the at least one region-of-interest from the target image by a light modulator; and detecting separated optical signals for the at least one region-of-interest based on different pixels by an optical detection unit, wherein the light modulator is a spatial light modulator and includes a phase only spatial light modulator that modulates an optical phase and a digital micromirror device that controls the optical phase for each pixel, and wherein the optical detection system further includes a relay lens unit for adjusting a size of a divided image from the spatial light modulator to match a predetermined size of a pixel of the optical detection unit.

6. The optical detection method of claim 5, wherein, in the selecting of the at least one region-of-interest and the generating of the specific pattern, the pattern generator distinguishes the specific pattern by differently setting directions, intervals, and colors of grating patterns for the at least one region-of-interest and also controls an optical path of an image object corresponding to each of the at least one region-of-interest.

7. The optical detection method of claim 6, further including:

outputting, by a display, the target image such that a user selects the at least one region-of-interest before the selecting of the at least one region-of-interest and the generating of the specific pattern, and wherein, after the detecting of the optical signals, the display outputs an optical signal received from the optical detection unit, and the pattern generator displays, on the display, an entire object screen which outputs all objects corresponding to the at least one region-of-interest and divided screens in a direction coincident with a movement direction of the image object based on the entire object screen.

8. The optical detection method of claim 7, wherein, in the selecting of the at least one region-of-interest and the generating of the specific pattern, the target image includes an image captured in high resolution, and the pattern generator converts an image resolution, a size, a position, and a direction such that coordinates of the at least one region-of-interest output by the display match specific coordinates of the at least one region-of-interest received by the light modulator.

* * * * *